US012729251B2

(12) United States Patent
Figuly et al.

(10) Patent No.: US 12,729,251 B2
(45) Date of Patent: Sep. 8, 2026

(54) ALGINATE-BASED POLYMERS AND PRODUCTS, AND THEIR MANUFACTURE

(71) Applicant: KEEL LABS, INC., Morrisville, NC (US)

(72) Inventors: Garret D. Figuly, Wilmington, DE (US); Matthew E. Gande, New York, NY (US); Minji Kim, Jersey City, NJ (US); Ray William Miller, Kennett Square, PA (US)

(73) Assignee: KEEL LABS, INC., Morrisville, NC (US)

( * ) Notice: Subject to any disclaimer, the term of this patent is extended or adjusted under 35 U.S.C. 154(b) by 768 days.

(21) Appl. No.: 18/021,935

(22) PCT Filed: Aug. 13, 2021

(86) PCT No.: PCT/US2021/045942
§ 371 (c)(1),
(2) Date: Feb. 17, 2023

(87) PCT Pub. No.: WO2022/040043
PCT Pub. Date: Feb. 24, 2022

(65) Prior Publication Data

US 2023/0374163 A1 Nov. 23, 2023

Related U.S. Application Data

(60) Provisional application No. 63/139,345, filed on Jan. 20, 2021, provisional application No. 63/067,988, filed on Aug. 20, 2020.

(51) Int. Cl.

| | |
|---|---|
| ***D01D 5/06*** | (2006.01) |
| ***C08B 37/00*** | (2006.01) |
| ***D01F 9/04*** | (2006.01) |
| ***D02G 3/04*** | (2006.01) |
| ***D02G 3/32*** | (2006.01) |

(52) U.S. Cl.
CPC .......... *C08B 37/0084* (2013.01); *D01D 5/06* (2013.01); *D01F 9/04* (2013.01); *D02G 3/04* (2013.01); *D02G 3/328* (2013.01); *D10B 2331/04* (2013.01); *D10B 2401/063* (2013.01)

(58) Field of Classification Search
None
See application file for complete search history.

(56) References Cited

U.S. PATENT DOCUMENTS

| | | | |
|---|---|---|---|
| 2,317,492 A | 4/1943 | Bamber et al. | |
| 3,266,906 A | 8/1966 | Miller et al. | |
| 5,531,716 A | 7/1996 | Luzio et al. | |
| 5,540,242 A | 7/1996 | Chao et al. | |
| 5,563,186 A * | 10/1996 | Thompson | C08B 37/0084 507/221 |
| 5,718,862 A | 2/1998 | Thompson | |
| 5,820,874 A | 10/1998 | Mahoney et al. | |
| 5,844,019 A * | 12/1998 | Kato | A61K 6/66 524/400 |
| 5,905,046 A | 5/1999 | Takeda et al. | |
| 6,638,917 B1 | 10/2003 | Li et al. | |
| 7,026,379 B2 | 4/2006 | Oyasato et al. | |
| 7,270,654 B2 | 9/2007 | Griego | |
| 7,674,837 B2 | 3/2010 | Gaserod et al. | |
| 7,947,073 B2 | 5/2011 | Gellman et al. | |
| 8,147,858 B2 | 4/2012 | Zhang et al. | |
| 8,460,692 B2 | 6/2013 | Zhang et al. | |
| 8,808,442 B2 | 8/2014 | Bernu et al. | |
| 8,999,300 B2 | 4/2015 | Iwama et al. | |
| 9,156,980 B2 | 10/2015 | Bastioli | |
| 9,352,066 B2 | 5/2016 | Dubey et al. | |
| 10,202,585 B2 | 2/2019 | Tomer | |
| 10,272,184 B2 | 4/2019 | Schmidt et al. | |
| 10,316,139 B2 | 6/2019 | Bastioli et al. | |
| 10,577,554 B2 | 3/2020 | Kheir et al. | |
| 11,131,040 B2 | 9/2021 | Meng et al. | |
| 11,345,779 B2 | 5/2022 | Bastioli et al. | |
| 2001/0002411 A1 | 5/2001 | Ronan et al. | |
| 2004/0078090 A1 | 4/2004 | Binette et al. | |
| 2005/0101900 A1 * | 5/2005 | Qin | D01F 9/04 602/49 |
| 2010/0178313 A1 | 7/2010 | Larsen et al. | |
| 2012/0237576 A1 | 9/2012 | Gordon et al. | |
| 2012/0288479 A1 * | 11/2012 | Melman | G03F 7/0043 205/333 |

(Continued)

FOREIGN PATENT DOCUMENTS

| | | |
|---|---|---|
| CN | 1978718 A | 6/2007 |
| CN | 101033564 A | 9/2007 |

(Continued)

OTHER PUBLICATIONS

Novel one pot synthesis of dicarboxylic acids mediated alginate zirconium biopolymeric complex for defluoridation of water, Prabhu et al., Carbohydrate Polymers, 120, 2015, 60-68 (Year: 2015).*
Office Action dated Nov. 27, 2025 issued in Chinese patent application No. 2021800510479, with English machine translation thereof.
Office Action dated Nov. 22, 2024, issued in Chinese patent application No. 202180051047.9, with English machine translation thereof.
Extended European Search Report dated Nov. 7, 2024, issued in European patent application No. 21858872.1.
Extended European Search Report dated Nov. 7, 2024, issued in European patent application No. 21858873.9.
Al-Otoum et al., "Preparation of novel ionotropically crosslinked beads based on alginate-terephthalic acid composites as potential controlled release matrices," *Pharmazie*, vol. 69, No. 1, Jan. 2, 2014, pp. 10-18.

(Continued)

*Primary Examiner* — Peter A Salamon
(74) *Attorney, Agent, or Firm* — Greenblum & Bernstein, P.L.C.

(57) ABSTRACT

Polymers comprising an alginate which is ionically cross-linked with unsubstituted dicarboxylate-bridged multivalent cations, products including such polymers, and methods of their manufacture.

21 Claims, No Drawings

(56) References Cited

U.S. PATENT DOCUMENTS

| | | | |
|---|---|---|---|
| 2015/0250165 | A1 | 9/2015 | Balastre et al. |
| 2019/0054211 | A1 | 2/2019 | Alsberg et al. |
| 2019/0367656 | A1 | 12/2019 | Kumar |
| 2020/0121825 | A1 | 4/2020 | Dowling |
| 2021/0062368 | A1 | 3/2021 | Huang et al. |
| 2021/0369875 | A1 | 12/2021 | Choi et al. |
| 2021/0402063 | A1 | 12/2021 | Alsberg et al. |
| 2022/0074092 | A1 | 3/2022 | Arvey |
| 2022/0243039 | A1 | 8/2022 | Dowling |
| 2023/0287210 | A1 | 9/2023 | Hayakawa et al. |

FOREIGN PATENT DOCUMENTS

| | | | | |
|---|---|---|---|---|
| CN | 101627152 | A | | 1/2010 |
| CN | 1807707 | B | | 4/2010 |
| CN | 103060946 | | | 4/2013 |
| CN | 103147167 | A | | 6/2013 |
| CN | 103147167 | B | * | 12/2014 |
| CN | 104562438 | A | | 4/2015 |
| CN | 105734719 | | | 7/2016 |
| CN | 108221086 | A | | 6/2018 |
| CN | 108451973 | A | | 8/2018 |
| CN | 111335036 | A | | 6/2020 |
| EP | 0 040 048 | A1 | | 11/1981 |
| EP | 0 527 271 | A1 | | 2/1993 |
| EP | 0 652 015 | B1 | | 3/1997 |
| EP | 0 906 069 | B1 | | 2/2004 |
| EP | 2 494 953 | B1 | | 9/2017 |
| EP | 2 773 779 | B1 | | 2/2018 |
| JP | S47-28091 | B | | 7/1972 |
| JP | 47-28091 | | | 10/1972 |
| JP | 08-13252 | | | 1/1996 |
| JP | H08-217612 | A | | 8/1996 |
| JP | 2006-83379 | A | | 3/2006 |
| JP | 2008-189889 | A | | 8/2008 |
| JP | 2018-035464 | A | | 3/2018 |
| JP | 2021-191810 | A | | 12/2021 |
| KR | 10-1125253 | B1 | | 3/2012 |
| KR | 10-2020-0052223 | A | | 5/2020 |
| WO | 98/012228 | A1 | | 3/1998 |
| WO | 2010/040129 | A2 | | 4/2010 |
| WO | 2014/044011 | A1 | | 3/2014 |
| WO | 2020/118080 | A1 | | 6/2020 |
| WO | 2022/040044 | A1 | | 2/2022 |

OTHER PUBLICATIONS

Decision of Rejection dated Oct. 30, 2025, issued in Chinese patent application No. 202180051045X, with English translation thereof.

Office Action dated Jun. 27, 2025 issued in Chinese patent application No. 2021800510479, with English machine translation thereof.

Prabhu et al., "Novel one-pot synthesis of dicarboxylic acids mediated alginate-zirconium biopolymeric complex for defluoridation of water," *Carbohydrate Polymers*, vol. 120, 2015, pp. 60-68.

Office Action dated Jul. 1, 2025 issued in Japanese patent application No. 2023-512041, with English machine translation thereof.

Office Action dated Jul. 1, 2025 in Japanese patent application No. 2023-512042, with English translation thereof.

Office Action dated Mar. 15, 2025, issued in Chinese patent application No. 202180051045.X, with English translation thereof.

ISR issued in International Patent Application No. PCT/US2021/045944, Nov. 10, 2021.

Written Opinion issued in International Patent Application No. PCT/US2021/045944, Nov. 10, 2021.

ISR issued in International Patent Application No. PCT/US2021/045942, Nov. 26, 2021.

Written Opinion issued in International Patent Application No. PCT/US2021/045942, Nov. 26, 2021.

R. Al-Otoum, S.R. Abulateefeh, M.O. Taha, "Preparation of novel ionotropically crosslinked beads based on alginate-terephthalic acid composites as potential controlled release matrices", Pharmazie 68: 1-9 (2013) (ISR '942).

C. Lu et al., "Antiplasticizing Behaviors of Glucarate and Lignin Bio-Based Derivatives on the Properties of Gel-Spun Poly(Vinyl Alcohol) Fibers", Macromolecular Materials and Engineering, vol. 303 (2018).

Pawar et al., "Alginate derivatization: A review of chemistry, properties and applications", Macromolecules and Interfaces Institute, Department of Wood Science and Forest Product, Institute for Critical Technology and Applied Science, Virginia Tech, Blacksburg, VA, Biomaterials 22 (2012) pp. 3279-3305.

Decision of Rejection dated Dec. 2, 2025, issued in Japanese patent application No. 2023-512041, with English translation thereof.

Office Action issued Sep. 8, 2023 in U.S. Appl. No. 17/299,563.

Office Action dated Dec. 2, 2025 issued in Japanese patent application No. 2023-512042, with English machine translation thereof.

Office Action dated May 22, 2026, issued in Chinese patent application No. 202180051045X, with English machine translation thereof.

Office Action dated May 28, 2026, issued in Japanese patent application No. 2023-512042, with English machine translation thereof.

Office Action dated Jun. 17, 2026, issued in Indian patent application No. 202217072772.

* cited by examiner

ALGINATE-BASED POLYMERS AND PRODUCTS, AND THEIR MANUFACTURE

PRIORITY

This application claims priority from U.S. Provisional Application No. 63/067,988, filed Aug. 20, 2020, and U.S. Provisional Application No. 63/139,345, filed Jan. 20, 2021, the disclosures of both of which are incorporated in their entirety by reference.

FIELD

The present application provides alginate-based polymers and products, such as fibers. The alginate-based fibers can be used to produce textiles as compostable alternatives to petrochemical-based polymers in a range of applications, such as footwear, apparel, accessories, packaging, and furniture industries.

BACKGROUND

Industry desires "cradle-to-grave" solutions for many products, such as textile products, whereby products can be made from renewable resources and then recycled or otherwise disposed of with little or no environmental impact. Attempts have been made to use natural products, such as alginates; however, the prior efforts have not been satisfactory because the products either did not have sufficient performance properties or used ingredients or solvents that resulted in adverse environmental impact.

SUMMARY

Products are provided that generally possess and retain excellent properties, such as elasticity, resilience, and tenacity, making them well-suited for many applications, including textile fibers. For instance, fibers (including filaments and staple), yarns (fiber bundles), and other textile products (e.g., fabrics, such as woven and nonwoven fabrics) of the invention have unexpectedly excellent mechanical integrity and can be used in a range of industries with the ability to dramatically reduce the environmental damage caused by the textile industry.

The products can be made using alginates derived from kelp and thus can be considered plant-based, reducing the need for harmful feedstocks. Kelp is a type of seaweed, or macroalgae, that is grown globally in cold coastal waters. Kelp is one of the fastest growing and most rapidly replenishing organisms on earth. The growth of kelp does not utilize harmful fertilizers and pesticides, does not use arable land, and does not use fresh water for irrigation. Kelp efficiently absorbs carbon/$CO_2$ and filters pollutants from surrounding waters during growth. Farming kelp can help rebuild economic and ecological communities affected by overfishing and pollution by providing a new income source and improving marine habitats. Kelp reportedly sequesters 20 times more carbon per acre than terrestrial forests, and therefore products made from kelp have a high likelihood of being carbon neutral or negative.

The products are well-suited for use in current and future industrial applications, and have properties making them well-suited replacements for currently used products in many industries, particularly the textile industry. For instance, fibers can be spun and processed using already existing wet-spinning equipment and using chemistry that is safer for workers and environment. Products have excellent characteristics, including for example, tensile strength (tenacity), break strength, elasticity, elongation, resilience, wet strength, modulus, and toughness, as compared to other alginate products, are compatible with the mechanical properties of rayon, and are biodegradable. Fibers manufacturing processability and efficiency is improved. The alginate-based products can readily absorb pigments and dyes using conventional methods.

The products are biodegradable and compostable, and can often be broken down by fungi and bacteria. Products may also be biodegradable in seawater and will not harm aquatic life even if consumed.

One advantage of the invention is that products can be made using water as a solvent. For instance, in wet spinning, water can be used in the dope and coagulation bath, whereas many other wet-spinning processes are carried out using either petroleum derived solvents or caustic solutions. This is advantageous from an environmental, processing, safety, and cost standpoint.

A polymer is provided comprising an alginate which is ionically crosslinked with unsubstituted dicarboxylate-bridged multivalent cations.

The alginate may be derived from an alginate salt with a monovalent cation. Alginate salts may be selected from the group consisting of sodium, potassium, ammonium alginate, and mixtures thereof. The alginate salt may be, for example, sodium alginate.

The polymers may be bridged using an unsubstituted C2-C20 dicarboxylate, such as a C2-C20 aliphatic dicarboxylate. In embodiments, the dicarboxylate is a C3-C12 dicarboxylate, such as a C3-C12 aliphatic dicarboxylate. Throughout this specification, reference will be made to the dicarboxylate bridge, which can be formed from aliphatic, alicyclic, or aromatic dicarboxylates, any of which are unsubstituted. These dicarboxylate bridges will generally be formed from dicarboxylates having from 2 to 20 (or more) carbons, but the number of carbons is not critical and a dicarboxylate having any number of carbons from 2-20 may be used. As used herein, a "C2" dicarboxylate has two carbons, a "C20" dicarboxylate has twenty carbons, etc.

The dicarboxylate may be derived from, for example, an unsubstituted aliphatic dicarboxylic acid selected from the group consisting of malonic acid, succinic acid, glutaric acid, adipic acid, pimelic acid, suberic acid, azelaic acid, sebacic acid, undecanedioic acid, dodecanedioic acid, brassylic acid, and tetradecanedioic acid. In embodiments, the unsubstituted dicarboxylate is aliphatic and the carbon chain is unsaturated.

In embodiments, the unsubstituted dicarboxylate is an alicyclic dicarboxylate.

In embodiments, the unsubstituted dicarboxylate is an aromatic dicarboxylate. In embodiments, the unsubstituted dicarboxylate is a C6-C20 aromatic dicarboxylate.

There is further provided a process of preparing a polymer as mentioned above, comprising combining: at least one monovalent cationic alginate salt; at least one unsubstituted C2-C20 dicarboxylate; and at least one multivalent cationic crosslinking agent; and reacting them to form the polymer. In embodiments, the process involves combining about 1 to about 125% of at least one dicarboxylate based on the weight of the alginate salt. The weight of the dicarboxylate may be, for example, at least 5%, such as at least 7.5%, based on the weight of the alginate salt. The weight of the dicarboxylate may be, for example, up to 100%, such as up to 75%, based on the weight of the alginate salt.

In embodiments, the process may be carried out in at least one coagulation bath containing about 0.02 to about 2 moles per liter of the at least one multivalent cationic crosslinking agent in a solvent. In embodiments, the multivalent cationic crosslinking agent is 0.05 to 1.5 moles per liter. In embodiments, the coagulation bath solvent is water.

There is further provided a process of preparing a shaped article from a polymer as discussed above, comprising: shaping the polymer to form a shaped article. In embodiments, the shaped article is a fiber; in embodiments, the shaped article is a film; and in embodiments, the shaped article is a fabric.

There is also provided a process of preparing a shaped article, comprising combining and reacting at least one monovalent cationic alginate salt, at least one unsubstituted C2-C20 dicarboxylate, and at least one multivalent cationic crosslinking agent, and with optionally one or more additives, to form the shaped article comprising a polymer including a crosslinked alginate. In embodiments, the shaped article is a fiber and the shaping comprises wet spinning.

There is also provided a process of preparing a fiber of a polymer as noted above comprising a wet spinning process which comprises (a) preparing a dope of at least one monovalent metal alginate salt and an at least one unsubstituted C2-C20 dicarboxylate in solvent; (b) extruding the dope through a spinneret to form fibers; (c) drawing the fibers through at least one coagulation bath containing solvent and at least one multivalent cationic crosslinking agent; and (d) drying the fibers.

In embodiments, the alginate salt may have a molecular weight of at least about 10,000 grams/mole. In embodiments, the alginate salt may have a molecular weight of up to about 500,000 grams/mole.

In embodiments, the alginate salt may have a G/M ratio of at least 1 and up to about 2.5.

In embodiments, the dicarboxylate is a sodium, potassium, lithium, or ammonium dicarboxylate.

In embodiments, the multivalent cationic crosslinking agent has cations selected from the group consisting of calcium, copper, iron, aluminum, zinc, magnesium, barium, chromium, cobalt, nickel, manganese, and mixtures thereof.

The multivalent cations may be derived from a crosslinking agent selected from the group consisting of calcium chloride, barium chloride, aluminum chloride, copper chloride, magnesium chloride, copper sulfate, aluminum sulfate, iron sulfate, zinc sulfate, magnesium sulfate, and mixtures thereof.

In embodiments, the dope comprises 0.5 to 50% by weight of the monovalent metal alginate salt, by weight of the dope. The weight of the monovalent metal alginate salt may be, for example, 1 to 40% by weight of the dope, such as 2 to 25% by weight of the dope, or 4 to 18% by weight of the dope.

In embodiments, the unsubstituted dicarboxylic acid salt is 1 to 125% based on the weight of the alginate salt in the dope, such as for example, 5 to 100% or 7.5% to about 75% by weight of the alginate salt in the dope. The balance of the dope may be, for example, primarily water.

In embodiments, the coagulation bath contains 0.02 to 2 moles per liter of the at least one multivalent cationic crosslinking agent in the coagulation bath solvent. The coagulation bath solvent may be, for example, primarily or substantially water. In embodiments, the multivalent cationic crosslinking agent is 0.05 to 1.5 moles per liter, such as for example, 0.075 to 0.75 moles per liter. In embodiments, the solvent of the dope is water.

The coagulation bath may contain, for example, at least 0.02 moles per liter of at least one multivalent cationic crosslinking agent. In embodiments, the coagulation bath contains at least 0.05 moles per liter of the at least one multivalent cationic crosslinking agent. In embodiments, the coagulation bath contains at least 0.075 moles per liter of the at least one multivalent cationic crosslinking agent. In embodiments, the coagulation bath contains up to 2 moles per liter of the at least one multivalent cationic crosslinking agent, such as up to 1.5 moles per liter of the at least one multivalent cationic crosslinking agent. In embodiments, the coagulation bath contains up to 0.75 moles per liter of the at least one multivalent cationic crosslinking agent.

In embodiments, the solvent of the dope is water.

In embodiments, the solvent of the coagulation bath is water.

In embodiments, the solvent of the dope is water and the solvent of the coagulation bath is water.

Also provided are a fiber (a) produced from the polymers, (b) produced from polymers made by the polymer process, or (c) produced by the fiber manufacturing process, and fabrics comprising the fibers.

In embodiments, the fabric is a knitted fabric, or a woven fabric, or a nonwoven fabric.

The invention further provides a film, foam, pellet, or granular particle, made from the polymer discussed above or the polymer produced by the process discussed above. The invention further provides a process of making the granular particle or pellet using a water-bath or spray process.

Additional features and advantages of the present disclosure will be set forth in part in the description that follows, and in part will be apparent from the description, or may be learned by practice of the present disclosure. The objectives and other advantages of the present disclosure will be realized and attained by means of the elements and combinations particularly pointed out in the description and claims.

The foregoing general description and the following detailed description are exemplary and explanatory only to provide a further explanation of the present disclosure and are not restrictive of the scope of the subject matter encompassed by the claims.

DETAILED DESCRIPTION

The particulars shown herein are by way of example and for purposes of illustrative discussion of the various embodiments of the present disclosure only, and provide what is believed to be the most useful and readily understood description of the principles and conceptual aspects of the disclosed subject matter. In this regard, no attempt is made to show details of the disclosed subject matter in more detail than is necessary for a fundamental understanding of the disclosure, the description making apparent to those skilled in the art how the several forms of the disclosure may be embodied in practice.

The following disclosure refers to more detailed embodiments. The disclosed subject matter, however, may be embodied in different forms and should not be construed as limited to the embodiments set forth herein. Although methods and materials similar or equivalent to those described herein can be used in the practice or testing of the invention, suitable methods and materials are described herein.

Unless otherwise defined, all technical and scientific terms used herein have the same meaning as commonly understood by one of ordinary skill in the art to which this disclosure belongs. The terminology used in the description herein is for describing particular embodiments only and is not intended to be limiting. As used in the specification and claims, the singular forms "a," "an," and "the" are intended to include the plural forms as well, unless the context clearly indicates otherwise. Also, the phrases "at least one" and "one or more" are intended to be interchangeable, and their use are not intended to limit the scope of any described or claimed feature preceded by "a," "an," and "the" to a singular form.

All publications, patent applications, patents, and other documents mentioned herein are incorporated by reference in their entirety. Unless otherwise defined, all technical and scientific terms used herein have the same meaning as commonly understood by one of ordinary skill in the art to which this invention belongs. In case of conflict, the present specification, including definitions, will control.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the specification and claims are approximations that may vary depending upon the desired properties sought to be obtained by a particular embodiment. At the very least, and not as an attempt to limit the application of the doctrine of equivalents to the scope of the claims, each numerical parameter should be construed in light of the number of significant digits and ordinary rounding approaches. When the term "about" is used in describing a value or an end-point of a range, the disclosure should be understood to include the specific value or end-point referred to.

Notwithstanding that the numerical ranges and parameters setting forth the broad scope of the disclosed subject matter are approximations, the numerical values set forth in the specific examples are reported as precisely as possible. Any numerical value, however, inherently contains certain errors necessarily resulting from the standard deviation found in the method used to obtain the value. Every numerical range given throughout this specification includes every narrower numerical range that falls within such broader numerical range, as if such narrower numerical ranges were all expressly written herein.

When an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

All percent measurements in this application, unless otherwise stated, are measured by weight based upon 100% of a given sample weight. Thus, for example, 30% represents 30 weight parts out of every 100 weight parts of the sample. Unless stated otherwise, all percentages, parts, ratios, etc., are by weight.

The present disclosure includes a large number and variety of components that are contemplated for inclusion in the disclosed compositions. It should be recognized that when the inventors expressly contemplate including such components, they also expressly contemplate excluding such components. Thus, all components disclosed herein are expressly contemplated for exclusion as well.

Except where expressly noted, trademarks are shown in upper case.

As used herein, the terms "comprises," "comprising," "includes," "including," "containing," "characterized by," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

The transitional phrase "consisting of" excludes any element, step, or ingredient not specified in the claim, closing the claim to the inclusion of materials other than those recited except for impurities ordinarily associated therewith. When the phrase "consists of" appears in a clause of the body of a claim, rather than immediately following the preamble, it limits only the element set forth in that clause; other elements are not excluded from the claim as a whole.

The transitional phrase "consisting essentially of" limits the scope of a claim to the specified materials or steps and those that do not materially affect the basic and novel characteristic(s) of the claimed invention. "A 'consisting essentially of' claim occupies a middle ground between closed claims that are written in a 'consisting of' format and fully open claims that are drafted in a 'comprising' format."

Where applicants have defined an invention or a portion thereof with an open-ended term such as "comprising," it should be readily understood that (unless otherwise stated) the description should be interpreted to also describe such an invention using the terms "consisting essentially of" or "consisting of."

The invention is directed to polymers having an alginate "backbone" that are ionically crosslinked with unsubstituted dicarboxylate bridged multivalent cations, their manufacture and use. (The term "backbone" is simply used in this description to refer to the fact that the polymeric components are substantially alginate or alginate-derived. It is not intended to imply that the entire polymeric component must be alginate as alginate is recognized in the art.) The dicarboxylate is essentially the di-anion of a dicarboxylic acid. The salt is generally preferred since it is water-soluble and works well in many applications, such as wet-spinning of fibers. Without wishing to be bound by any particular theory of operation, it is believed the multivalent cation (e.g., calcium or other cations) from the crosslinking agent replaces the sodium or other metal counterions of the dicarboxylic acid salt and connects the dicarboxylate to the anion of the carboxylate groups of the alginate. In embodiments, the polymers of the invention can be characterized as crystalline, semi-crystalline or amorphous.

There have been other attempts at making alginate fibers but those attempts do not use the presently disclosed concepts. For example, CN 101033564A describes preparing calcium alginate fibers by wet spinning using calcium chloride crosslinking agent. These fibers do not have adequate properties for commercial use. Other documents, such as U.S. Pat. No. 7,270,654, mention use of alginates in making shaped articles, but none of them teach products having properties suitable for industrial use and that later have minimal or no environmental impact.

WO 2020/118080 A1 is directed to alginate compositions comprising sodium alginate, methyl cellulose, and a polyol plasticizer (glycerol), as well as their use in wet-spinning of fibers, and fabrics and films.

The presently inventive polymer is made from (a) the alginate backbone, (b) the unsubstituted dicarboxylate, and (c) the multivalent cations. The relative proportions of each will generally be dependent on the molecular weight, or chain length, of the dicarboxylate used, and valency and weight of the multivalent cation(s) used. While embodiments may include only one type of alginate, dicarboxylate, or multivalent cation, more than one type of each component may be included such that, for example, mixtures of one or more of alginates, dicarboxylates and multivalent cations can be used.

In embodiments, the dicarboxylate bridges are present in at least about 0.1 and at least about 0.2 molar equivalents with respect to the alginate carboxylate content. In embodiments, the dicarboxylate bridges are present in up to about 1.0, up to about 0.5 and up to about 0.75, molar equivalents with respect to the alginate carboxylate content.

In embodiments, the alginate backbone can comprise from at least about 20 weight % of the polymer, or at least about 50, 60, 70, 80, 90, or 92.5 weight % of the polymer. In embodiments, the alginate backbone can comprise from up to about 95 weight % of the polymer.

In embodiments, the unsubstituted dicarboxylate can comprise at least about 1 weight % of the polymer, or at least about 5, 7.5, 10, 20, 30, 40, or 50 weight % of the polymer.

Starting Materials

The polymers can be made from: at least one monovalent cationic alginate salt; at least one unsubstituted C2-C20 dicarboxylate; and at least one multivalent cationic cross-linking agent.

Alginates

The polymers of the invention have an alginate backbone. Any suitable alginate cationic salt can be used to make the polymers of the invention. They can be made using at least one alginate that is derived from one or more alginate salts with a monovalent cation. Examples include, but are not limited to, sodium, potassium, and ammonium salts. In embodiments, the polymers are made using sodium alginate.

Naturally occurring alginates are polysaccharides consisting of linear copolymers of β-(1-4) linked d-mannuronic acid units (M-Units) and β-(1-4) linked 1-guluronic acid units (G-Units) connected via glycosidic bonds. The units can be found in homopolymer blocks (MM or GG) or a random copolymer blocks (GM) within the polymer chain. Alginates salts are commonly described by their ratio of G-units to M-units, or G/M ratio. The G/M ratio can vary widely but is typically found to be between 3:1 and 1:3. Alginates useable within the present invention may be naturally derived (from, for example, kelp), or may be made through biotechnological methods. The present invention is not limited by the source of the alginate.

Alginates useable within the present invention may have their original, i.e., "natural," structure, or may be chemically modified, such as for example, propylene glycol alginate. Such modification is acceptable provided that it does not unacceptably interfere with the basic concept of the invention.

Alginate salts with any suitable G/M ratio can be used. The G to M ratio is determined by High Performance Anion Exchange—Pulsed Amperometric Chromatography (HPAE-PAC).

In embodiments, the G/M ratio is at least 0.5. In embodiments, the G/M ratio is at least about 1. In at least embodiments, the G/M ratio is at least 1.5. The G/M ratio may be up to about 2.5. In embodiments, the G/M ratio may be up to about 2. One contemplated alginate salt has a G/M ratio about 1.8.

Alginate salts can be described by their molecular weight and/or viscosity. Herein, they are described relative to each. As used herein, molecular weight is measured multiangle light scattering (MALS) for best efficiency and accuracy. This method yields weight average molecular weights ($M_w$) and any reference to alginate molecular weight herein is to $M_w$. Molecular weight directly impacts the measured viscosity in solution. High viscosities are generally caused by high average molecular weights. To measure viscosity directly, typically a 1% by weight aqueous solution is kept at 20° C. and viscosity is acquired with a Brookfield viscometer. The skilled artisan will readily recognize that the viscosities presented do not correlate exactly to the described molecular weights, and that one or both of these properties can be used in order to select alginate salts useful for a given application.

Alginate salts may have, in embodiments, a molecular weight of at least about 10,000 grams/mole, at least about 15,000 grams/mole, at least about 50,000 grams/mole, or at least about 90,000 grams/mole. In embodiments, alginate salts have a molecular weight of up to about 500,000 grams/mole, up to about 325,000 grams/mole, or up to about 250,000 grams/mole. In terms of viscosity, alginate salts may have a viscosity of at least about 15 cP, at least about 20 cP, at least about 25 cP, at least about 30 cP, at least about 35 cP, or at least about 40 cP. Alginate salts may have a viscosity of up to about 1000 cP, up to about 900 cP, up to about 800 cP, up to about 700 cP, up to about 600 cP, up to about 500 cP, up to about 400 cP, or up to about 325 cP.

Embodiments may have both high molecular weight and a high G/M ratio. In such embodiments, alginate salts can have a molecular weight of about 200,000 to about 500,000 grams/mole, or a viscosity of about 150 cP to about 1,000 cP, and a G/M ratio of about 1.5 up to about 2.5.

Embodiments may have high molecular weight and a low G/M ratio. In this embodiment, alginate salts have molecular weight of about 200,000 to about 500,000 grams/mole or viscosity of about 150 cP to about 1,000 cP, and a G/M ratio of about 0.5 to about 0.75.

Embodiments may have low molecular weight and a high G/M ratio. In such embodiments, alginate salts can have molecular weight of about 30,000 to about 200,000 grams/mole or viscosity of about bout 20 cP to about 150 cP, and a G/M ratio of about 1.5 up to about 2.5.

Embodiments may have low molecular weight and a low G/M ratio. In such embodiments, alginate salts can have molecular weight of about 30,000 to about 200,000 grams/mole or viscosity of about bout 20 cP to about 150 cP, and a G/M ratio of about 0.5 to about 0.75.

Embodiments may have medium G/M ratios. In embodiments where medium G/M ratios are present, a G/M ratio of about 0.75 to about 1.5 may be specified.

Examples of alginate salts useful in the practice of this invention are commercially available. Examples include, for example: Algin IL-6G (Kimica, Tokyo Japan); Algin I-3G (Kimica); Algin I-8 (Kimica); ALGOGEL® 3541 (Algaia, Paris France); ALGOGEL® 7041 (Algaia, Paris France); SATIALGINE® S1600N (Algaia); SATIALGINE® S20NS (Algaia); ProNova SLM 100 (International Flavors & Fragrances NovaMatrix, Sandvika Norway); ProNova SLG 20 (International Flavors & Fragrances NovaMatrix); Alginic acid sodium salt (Sigma Aldrich, St. Louis Missouri). In wet-spinning, use of a low molecular weight in conjunction with a high G/M ratio (such as Algin IL-6G) is preferred for processibility.

Dicarboxylates

The polymers of the invention are ionically crosslinked with unsubstituted dicarboxylate bridged multivalent cations. As used herein, the term "dicarboxylate" refers to unsubstituted dicarboxylic acid salts. The skilled artisan will readily recognize that dicarboxylates have positive counterions associated with their carboxyl groups.

The dicarboxylate bridge is derived from any useful unsubstituted dicarboxylate. In embodiments, the dicarboxylate bridge is an unsubstituted C2-C20 dicarboxylate bridge and is derived from an unsubstituted C2-C20 dicarboxylate obtained from a C2-C20 unsubstituted dicarboxylic acid.

In embodiments, the unsubstituted dicarboxylate bridge is a C2-C20 aliphatic dicarboxylate bridge and is derived from a C2-C20 aliphatic dicarboxylate obtained from a C2-C20 aliphatic dicarboxylic acid.

Herein, when referring to the bridge, the salt, and the acid, the person of ordinary skill in the art will readily recognize the correlation. Examples include, for example, C3-C12 dicarboxylates obtained from unsubstituted C3-C12 dicarboxylic acids. In the following discussion, when referring to features of the bridge, salt, or acid the person of ordinary skill in the art should also read the description to encompass the corresponding bridge, salt, or acid.

When referring to "aliphatic" dicarboxylates or dicarboxylic acids, the invention is referring to dicarboxylates or dicarboxylic acids with linear, branched, or cycloaliphatic hydrocarbon chains. In embodiments, linear or branched hydrocarbons are used. In embodiments, linear hydrocarbons are selected.

In embodiments, the unsubstituted dicarboxylate is aliphatic and the carbon chain is saturated. In this embodiment, the dicarboxylate is, for example, derived from a saturated aliphatic dicarboxylic acid selected from the group consisting of oxalic, malonic acid, succinic acid, glutaric acid, adipic acid, pimelic acid, suberic acid, azelaic acid, sebacic acid, undecanedioic acid, dodecanedioic acid, brassylic acid, and tetradecanedioic acid. In embodiments, the dicarboxylate is derived from an unsubstituted aliphatic dicarboxylic acid selected from the group consisting of succinic acid, glutaric acid, adipic acid, pimelic acid, suberic acid, azelaic acid, sebacic acid, and mixtures thereof. In embodiments, the dicarboxylate is derived from a saturated aliphatic dicarboxylic acid selected from the group consisting of succinic acid, glutaric acid, adipic acid, suberic acid, azelaic acid, sebacic acid, and mixtures thereof. In embodiments, the saturated aliphatic dicarboxylate is derived from a C4-C8 dicarboxylic acid. In embodiments, the saturated aliphatic dicarboxylate is derived from a dicarboxylic acid selected from the group consisting of succinic acid, adipic acid, sebacic acid, and mixtures thereof. In embodiments, the unsubstituted aliphatic dicarboxylic acid is sebacic acid; in embodiments, the dicarboxylic acid is adipic acid; in embodiments, the dicarboxylic acid is glutaric acid; and in embodiments, the dicarboxylic acid is succinic acid.

In embodiments, the unsubstituted dicarboxylate is aliphatic and the carbon chain is unsaturated. Examples of unsaturated aliphatic dicarboxylic acids useful in the invention include but are not limited to maleic and fumaric acid.

Alicyclic and aromatic dicarboxylic acids are also useable within the present invention. In embodiments the unsubstituted dicarboxylate is an alicyclic dicarboxylate, such as a C3-C20 alicyclic dicarboxylate. Examples of alicyclic dicarboxylic acids useful in the invention include but are not limited to cyclopentane dicarboxylic acid, cyclohexane dicarboxylic acid, and norbornane dicarboxylic acid.

In embodiments the unsubstituted dicarboxylate is an aromatic dicarboxylate, such as a C6-C20 aromatic dicarboxylate. Examples of aromatic dicarboxylic acids useful in the invention include but are not limited to terephthalic acid, naphthalene dicarboxylic acid, and anthracene dicarboxylic acid.

The specific examples of dicarboxylic acids listed above are for reference only and the present invention is not limited to these examples. Mixtures of one or more dicarboxylic acid can be used in any of these embodiments, and in other instances use of only one dicarboxylic acid may be preferred.

Dicarboxylates can be formed by reacting a dicarboxylic acid and base. These dicarboxylates can be purchased or easily prepared. In embodiments, they are prepared and isolated in a separate reaction in advance of use. Alternatively, they can be prepared by sequential addition.

Examples of dicarboxylates include but are not limited to sodium, potassium, lithium, or ammonium dicarboxylates. Embodiments use sodium dicarboxylate. Embodiments use potassium dicarboxylate. Mixtures of dicarboxylates can be used.

For use in wet-spinning and other applications where the dicarboxylic acid or salt is dissolved in a solvent, such as water, solubility is important and it may be necessary to use co-solvents or alternative monovalent counterions to insure sufficient solubility of the higher molecular weight dicarboxylates.

Any suitable base can be used for making the dicarboxylates. For wet-spinning, it may be desirable to use salts that are soluble in the solvent, most commonly water. In embodiments, the base is selected from sodium hydroxide, potassium hydroxide, ammonium hydroxide, sodium carbonate, potassium carbonate, lithium carbonate, lithium hydroxide, sodium bicarbonate, potassium bicarbonate, lithium bicarbonate, and mixtures thereof. In embodiments, the base is sodium hydroxide. In embodiments, the base is potassium hydroxide.

Making of the dicarboxylates is well-known in the art, and can be done by using solutions or solids, etc., using any technique, including conventional techniques. As an example, sodium hydroxide can be purchased in solution or as a solid, and then reacted with a dicarboxylic acid. Caustic solutions, such as 50% sodium hydroxide solution in water, are readily available. Caustic can also be purchased as a solid.

Crosslinking Agent

In the polymers of the invention, the alginate backbone is ionically crosslinked with dicarboxylate bridged by multivalent cations. That is, through ionic bonding, at least one multivalent cationic crosslinking agent attaches the dicarboxylate to the alginate backbone.

There can also be direct ionic crosslinking by the multivalent cations. This would, of course, be dependent on stoichiometry and can be used to adjust the properties of the polymers and resultant products.

Examples of multivalent cations are calcium, copper, iron, aluminum, zinc, magnesium, barium, chromium, cobalt, nickel, manganese, and mixtures thereof. Crosslinking multivalent cations may be selected from calcium, copper, iron, aluminum, zinc, cobalt, barium, and mixtures thereof. In embodiments, the crosslinking cation is selected from calcium, copper, iron, aluminum, and zinc, and mixtures thereof. In embodiments, the crosslinking cation is selected from calcium, copper, aluminum, and mixtures thereof. In one specific embodiment, the crosslinking cation is calcium.

Any suitable cationic crosslinking agent that is sufficiently soluble in the amount of water or other solvent system (e.g., glycerol) used to carry out the reaction can work. Examples of crosslinking agents include, for example, calcium chloride, barium chloride, aluminum chloride, copper chloride, copper sulfate, aluminum sulfate, iron sulfate, and zinc sulfate. More particular crosslinking agents are calcium chloride, barium chloride, calcium bicarbonate, copper sulfate, aluminum sulfate, iron sulfate, and zinc sulfate. One specific crosslinking agent is calcium chloride.

Celluloses

Celluloses can be added to the polymers, such as described in WO 2020/118080 A1. Examples of suitable celluloses include methylcellulose, ethylcellulose, carboxymethyl cellulose, hydroxethyl cellulose, hydroxpropyl cellulose, cellulose acetate, cellulose diacetate, cellulose triacetate, cellulose acetate-propionate, cellulose acetate-butyrate, nitrocellulose, other cellulose derivatives, or combinations thereof. In many embodiments, celluloses are not used.

Additives

The polymers and products made with them may contain one or more additives, examples of which are known in the art, and which may be used in amounts suitable for the desired properties, typical of those described in the art. Examples of these types of additives are well known in the art and include pigments, dyes, whitening agents, or other coloring agents, optical brighteners, stabilizers (e.g., flame or fire retardants, light stabilizers, thermal stabilizers, antioxidants), plasticizers, delusterants (e.g., $TiO_2$, $CaCO_3$, silicon dioxide), viscosity modifiers, surfactants, antimicrobials, anti-static agents, lubricants, processing aids, slip additives, antiblock agents, release agents, fillers, and other components known in the art to be useful additives. (Some additives, such as $TiO_2$, may fulfill more than one of these purposes.) It will be readily recognized that additives may be incorporated in various process steps and using a variety of techniques.

The Polymer and Products

The products of the invention are well-suited for use in current and future industrial applications, and have properties making them well-suited replacements for currently used products in many industries, particularly the textile industry. The products of the invention possess and retain excellent properties, such as elasticity, resilience and tenacity, making them well-suited for many applications, including textile fibers and films. For instance, fibers (including filaments and staple), yarns (fiber bundles), and other textile products (e.g., fabrics, such as woven and nonwoven fabrics) of the invention have unexpectedly excellent mechanical integrity and can be used in a range of industries with the ability to dramatically reduce the environmental damages caused by the textile industry.

Various types of fibers can be made using the invention, including filaments and staple fibers. These terms are used in their ordinary commercial meanings. Typically, herein, "filament" is used to refer to the continuous fiber on the spinning machine.

"Staple fiber" is used to refer to cut fibers or filaments. For instance, staple fibers for nonwoven fabrics may have lengths of at least about 1 inch. In some embodiments, the length is at least about 1.25 inches or even more. Depending on the use, lengths can be up to about 6 inches or more. In embodiments, the length is up to about 4 inches. In embodiments, the length is up to about 2 inches.

Embodiments are focused on primarily or only using the polymers of this invention (optionally with additives), sometimes referred to in the art as monocomponent fibers or configurations. However, other embodiments can include the polymers of this invention with other polymers. That is, the polymers of the invention may be used in multicomponent (e.g., bicomponent) configurations, including conventional sheath/core and side-by-side multicomponent configurations, and multiconstituent (e.g., biconstituent) configurations. Where there are multiple polymers (including the indicated one or more alginates) present, any suitable combinations of the polymers, including the multicomponent and multiconstituent configurations, can be employed. The types and proportions of the polymers used can be readily determined by those of ordinary skill in the art, without undue experimentation. For instance, those embodiments can include very small amounts of the polymer of the invention to large amounts of the polymers. As such, embodiments can contain at least about 5%, at least about 10%, at least about 15%, at least about 20%, at least about 30%, at least about 40%, at least about 50%, at least about 75%, at least about 85%, at least about 90%, at least about 95%, or up to 100%, of the polymer, all by weight of the fiber.

Yarns (also known as "bundles") preferably comprise many filaments.

Fiber size and shape will vary by application, and can be as low as 0.1 denier per filament (dpf) or smaller, and as large as 300 dpf or larger. For many textile applications, the fiber of the present invention has a denier per filament (dpf) of at least about 0.1, at least about 0.5, and has a dpf of up to about 30, up to about 10, up to about 5, more preferably up to about 3, depending on the end-use. These sizes are for exemplary purposes and the skilled artisan is familiar with the desired sizes for various purposes.

The invention can also be used to prepare monofilaments. Monofilaments will often be about 10 to about 300 dpf. Monofilaments, monofilament yarns, and use thereof are well known in the art.

The fibers or filaments can be any shape, including for example, round, substantially round, oval, or have other shapes, such as grooved, mostly flat, dog-bone, octalobal, delta, sunburst (also known as sol), scalloped oval, trilobal, tetra-channel (also known as quatra-channel), scalloped ribbon, ribbon, starburst, snowman, etc. They can be solid, hollow or multi-hollow. In embodiments, the fibers are round or substantially round, solid filaments. In embodiments, the fibers are flat or substantially flat, solid filaments. In embodiments, the fibers are ribbon or scalloped ribbon filaments.

The invention includes fabrics made of the fibers, including knitted, woven, nonwoven, and other types of fabrics. Woven or knitted fabrics can be made from and not limited to monofilament, multifilament, and spun yarns. Nonwoven fabrics are generally made either from staple fiber through a wet laid, air laid, or carding process, or through direct formation using an electrospinning or solution blown process. Fabrics can include blends with other types of fibers or filaments, including spinning together fibers of alginate with other natural and synthetic fibers, and coating existing yarns with alginate hydrogels or filaments.

The invention includes all types of textile end-uses, such as apparel (e.g., clothing or fabrics for footwear) or staple fibers and filaments useful in technical textiles, such as carpeting, car interiors, wall covering.

Yarns and fabrics include blends with staples and filaments such as those made of cotton, animal materials (e.g., wool and chitosan), regenerated celluloses (e.g., viscose (Rayon) and lyocell (Rayon), compostable polymers such as polylactic acid (PLA) and polyhydroxybutyrate (PHA), bast (e.g., linen and hemp), and protein based materials (e.g. silk). Blends can also include synthetic fibers (staples and filaments) such as aramid (e.g., KEVLAR® and NOMEX®), polyamide (e.g., nylon 6; nylon 6,6; nylon 6,10; nylon 5,6; and nylon 6,12), polyester (e.g., polyethylene terephthalate (PET), polytrimethylene terephthalate (PTT) (SORONA®), polybutylene terephthalate (PBT) (polytetramethylene terephthalate), polypropylene and polyethylene (e.g., ultahigh molecular weight (UHMW) polyethylene). The skilled artisan will readily recognize the desired sizes and other properties of those fibers. For example, filament and staple fiber blends can contain at least about 10 weight %, at least about 25 weight %, at least about 30 weight %, at least about 40 weight %, at least about 45 weight %, at least about 50 weight %, at least about 55 weight %, at least about 60 weight %, at least about 75 weight %, and at least about 90 weight % of the filaments or staple fibers of the invention with commercially available filaments or staple fibers of the other polymers which are at least about 0.5 dpf, at least about 1 dpf, at least about 2 dpf, at least about 3 dpf, at least about 5 dpf and at least about 10 dpf filaments or larger, depending on the use. In embodiments, the fibers or filaments are up to at least about 10 dpf and up to at least 5 dpf.

Yarns and fabrics can contain small amounts (e.g., at least about 1, at least about 2, at least about 3, at least about 4, and at least about 5 weight %, and up to about 10 weight % or up to about 5 weight %) of elastic filaments and fibers (e.g., spandex, elastane, or sheath-core and side-by-side PET/PTT, PET/PBT and PTT/PBT bicomponent fibers) having appropriate size and stretch characteristics can be added for desired fiber and fabric properties. The stretch filaments and fibers can have sizes of at least about 0.5 dpf, at least about 1 dpf, at least about 2 dpf, at least about 3 dpf and at least about 5 dpf. In embodiments, the filaments and fibers have sizes up to about 10 dpf and up to about 5 dpf.

The invention also includes films, foams, granular particles, and hydrogel of the polymers. Films can be made by conventional methods including but not limited to spin coating, spin casting, solvent casting and single layer or multilayer co-extrusion. Foams can be made by conventional methods including but not limited to open pore (continuous dispensing), and closed pore.

Granular particles or pellets can be made using a water-bath (e.g., cutting taking place in the water-bath) or spray process. Examples of granular particles include but are not limited to microspheres or microencapsulations for agricultural product delivery (e.g., pesticides such as insecticides, fungicides, and herbicides, and other types of agricultural products), drug delivery, spraying scents, or for encapsulating powder for laundry and dish detergent. Granular particles can also be used to encapsulate cells or bacteria.

It will readily be recognized that many other products can be made using the polymers of the invention using conventional processes.

Provided is a process of preparing the polymer comprising: (a) combining: (i) at least one monovalent cationic alginate salt; (ii) at least one unsubstituted dicarboxylate; and (iii) at least one multivalent cationic crosslinking agent; and (b) reacting them to form the polymer.

Embodiments comprise first combining the at least one monovalent cationic alginate salt with the at least one unsubstituted dicarboxylate to form a mixture, followed by combining the mixture with the at least one multivalent cationic crosslinking agent to form the polymer.

In addition, provided is a process of preparing a shaped article from the polymer comprising shaping the polymer to form a shaped article. In embodiments, the shaped article is a fiber. In embodiments, the shaped article is a film. In embodiments, the shaped article is a fabric.

Embodiments comprises combining the alginate and the unsubstituted dicarboxylate, followed by shaping, followed by addition of the crosslinking agent.

In embodiments, the process involving reacting alginate salt with at least about 2.5%, at least about 5%, at least about 7.5%, and at least about 10%, based on the weight of the alginate salt, of the at least one unsubstituted dicarboxylate. In embodiments, the process involving reacting alginate salt with up to about 125%, up to about 100%, and up to about 75%, based on the weight of the alginate salt, of the at least one unsubstituted dicarboxylate.

In embodiments a dope is used. In those embodiments, (a) the dope comprises about 0.5 to about 50% by weight of the monovalent metal alginate salt, by weight of the dope, (b) about 1 to about 125% of at least one unsubstituted dicarboxylate based on the weight of the alginate salt in the dope, and the balance primarily or substantially water. The weight of the monovalent metal alginate salt may be at least about 1%, or at least about 2%, or at least about 4%, by weight. The weight of the monovalent metal alginate salt may be up to about 40%, or up to about 25%, or up to about 18%.

In embodiments, the process is carried out in a bath containing about 0.02 to about 2 and about 0.05 to about 1.5 moles per liter of the at least one multivalent cationic crosslinking agent in a solvent. In embodiments, the solvent is water.

Wet Spinning

In embodiments, the invention is directed to fibers (such as continuous filaments and staples), yarns (e.g., spun yarns), and other textile products (e.g., fabrics, such as woven and nonwoven fabrics), such as wet-spun fibers, yarns, and textile products. One advantage of the fibers, yarns, and other textile products is that they can be made using already existing industrial equipment.

One manufacturing process involves wet-spinning. One particular wet-spinning process comprises the following steps: Preparing a dope of at least one monovalent cation alginate salt and at least one unsubstituted C2-C20 dicarboxylate in solvent; extruding the dope through a spinneret to form fibers; drawing the fibers through a coagulation bath containing solvent and at least one multivalent cationic crosslinking agent; and drying the fibers. One or more coagulation baths may be used.

The solvents in the dope and coagulation bath can be water. It would also be possible, but not preferable, to use an alcohol as the solvent. The water can contain alcohol (for example, no more than 50%, and in particular embodiments, lower amounts), such as methanol, ethanol, isopropyl alcohol, or glycerol mixed in, although the skilled artisan will readily recognize the advantages of using water by itself as a solvent. That is, this is advantageous from an environmental, processing, safety, and cost standpoint. One or more coagulation baths may be used, and the coagulation baths may have different solvents (with water being preferred as a solvent for all of them) or multivalent cations at different concentrations. One advantage of the invention is that in embodiments, the solvents in the dope and coagulation bath are water.

The temperature of the dope and bath can vary and may be the same or different. As the preferred solvents include water, the temperatures will generally be greater than 0° C. and less than 100° C. As multiple baths may be used, the temperatures in those baths may also be varied to achieve a desired effect.

The dope can include common additives, such as but not limited to light and thermal stabilizers, pigments and dyes, antimicrobials, delustering agents, fillers, flame retardants, plasticizers, viscosity modifiers, processing aids, and other components known in the art to be useful additives.

The coagulation bath can include other components such as, but not limited to, non-crosslinking ions (e.g., sodium and potassium), dyes, surfactants, antiblocks, slip agents, and flame retardants.

In embodiments, the free dicarboxylic acid and a base are mixed in solvent to form the dicarboxylate, and the alginate salt is then added.

In embodiments, the process further comprises a washing step following the drawing and prior to the drying. In embodiments, the drawing is carried out in one or more drawing steps.

In embodiments, the process further comprises cutting the fibers into staple fibers.

In embodiments, the process further comprises winding the fibers into continuous filament.

The drawing can be carried out in one or more drawing steps.

In embodiments, the process further comprises texturizing the filaments. In embodiments, the process further comprises crimping.

In embodiments, the process further comprises applying a spin finish. Examples of spin finishes are known in the art.

In embodiments, (a) the dope comprises about 0.5 to about 50% by weight of the monovalent metal alginate salt, by weight of the dope, (b) about 1 to about 125% of at least one unsubstituted dicarboxylate based on the weight of the alginate salt in the dope, and the balance primarily or substantially water. The weight of the monovalent metal alginate salt may be at least about 1%, or at least about 2%, or at least about 4%, by weight. The weight of the monovalent metal alginate salt may be up to about 40%, or up to about 25%, or up to about 18%. The weight of the unsubstituted dicarboxylate may be at least about 5%, or at least about 7.5%, or at least about 10%, by weight of the alginate salt in the dope. The weight of the unsubstituted dicarboxylate may be up to about 100% by weight, or up to about 75%, by weight of the alginate salt in the dope.

The coagulation bath may contain at least about 0.02, at least about 0.05, or at least about 0.075, moles per liter of at least one multivalent cationic crosslinking agent. The coagulation bath may contain up to about 2, up to about 1.5, or up to about 0.75, moles per liter of at least one multivalent cationic crosslinking agent.

Crosslinking takes place in one or more coagulation baths. Thus, the process may be carried out using one or more coagulation baths set up independently or in series, and optionally can involve use of counterflow for improving curing efficiency. To allow sufficient crosslinking to occur, the fibers can spend at least about 2 seconds, or at least 5 seconds, in the one or more coagulation baths. The fibers may spend up to about 20 seconds, or up to about 15 seconds in the one or more coagulation baths.

Various finishes, such as spin finishes and/or overfinishes, may be applied as desired, providing antistatic, lubricant, and/or such other properties as may be desired for processing the fibers of this invention into a particular article of manufacture.

The invention also includes methods to color the alginate-based fibers, yarns, or textiles, including a traditional dip-dying or a dope-dyeing process, wherein a colorant is added into the dope. Various ranges of dyes and pigments can be used to color the alginate-based fibers, yarns, or textiles of the present application without affecting the inherent chemistry or mechanical properties of the alginate-based fibers, yarns, or textiles, including natural, non-toxic, or biosynthetic dyes or pigments.

EXAMPLES

Example 1

A stock 2% w/v solution of sodium adipate was prepared by adding 1 part by volume 10M NaOH to 99 parts by volume distilled water. To this solution was added 1.46 parts by weight of adipic acid. A high molecular weight high G alginate solution was prepared by dissolving 5 parts by weight ALGIN™ I-3G-80 (Kimica, Tokyo, Japan) in 50 parts by volume of the stock sodium adipate solution and 45 parts by volume distilled water. After entrained air was removed, this solution was filtered with 3 μm filter, and extruded through a 150 μm spinneret at a rate of 0.14 mL per hole per minute. The fiber was pulled through a 1 meter coagulation bath, containing 0.12M $CaCl_2$, at 6.0 m/min. It was then drawn through a distilled water bath, to remove residual calcium salts, at 8.1 m/min, and heated on a godet. Filament was collected on a spool at 8.4 m/min. After drying under ambient conditions overnight, filament was conditioned at 22° C. and 65% Relative Humidity before determining filament denier and measuring tensile properties (ASTM 2256). Results (average of 10 replicates per sample) can be found in Table 1.

Control Example 1

A solution of a high molecular weight alginate containing a high level of guluronic acid units ("high G") was prepared by dissolving 5 parts by weight ALGIN™ I-3G-80 (Kimica, Tokyo, Japan) into 95 parts by weight distilled water. After entrained air was removed, the solution was filtered with 3 μm filter, and extruded through a 150 μm spinneret at a rate of 0.14 grams per hole per minute. The fiber was pulled through a 1 meter coagulation bath, containing 0.12M CaCl2, at 6.0 m/min. It was then drawn through a distilled water bath, to remove residual calcium salts, at 8.1 m/min, and heated on a godet. Filament was collected on a spool at 8.4 m/min. After drying under ambient conditions overnight, the sample was conditioned at 20±2° C. and 65±3% Relative Humidity before determining denier and measuring tensile properties (ASTM 2256). Results (average of 10 replicates per sample) can be found in Table 1.

TABLE 1

| Example | MW | G Ratio | Dicarboxylate | Denier (g/9000 m) | Elongation at Break (%) | Tenacity at Break (g/den) | Modulus (g/den) | Elongation at Yield (%) | Tenacity at Yield (g/den) |
|---|---|---|---|---|---|---|---|---|---|
| Control Ex. 1 | High | High | None | 8.7 | 5.6 | 2.91 | 70 | 3.1 | 2.16 |
| Example 1 | High | High | Adipate | 8.3 | 6.1 | 3.05 | 72 | 3.1 | 2.21 |

The data in Table 1 shows that adding a dicarboxylate results in increased elongation at break and tenacity at break.

Example 2

A sodium adipate solution was prepared by dissolving 0.58 parts by weight adipic acid in 85 parts by volume 0.09M aqueous NaOH with stirring until completely dissolved. To this was added 5 parts by weight high molecular weight, high G sodium alginate ALGIN™ I-3G-80 and 9.5 parts distilled water and was stirred until all the alginate was dissolved. After entrained air was removed, the solution was filtered with 3 μm filter, and extruded through a 150 μm spinneret at a rate of 0.14 grams per hole per minute. The fiber was pulled through a 1 meter coagulation bath, containing 0.12M $CaCl_2$, at 6.0 m/min. It was then drawn through a distilled water bath, to remove residual calcium salts, at 8.1 m/min, and heated on a godet. Fiber was collected on a spool at 8.4 m/min. After drying under ambient conditions overnight, filaments were conditioned at 20±2° C. and 65±3% Relative Humidity before determining filament denier and measuring tensile properties (ASTM 2256). Results (average of 10 replicates per sample) can be found in Table 2.

EXAMPLE

Example 2 was repeated using a sodium succinate solution prepared by dissolving 0.47 parts by weight succinic acid in 85 parts by volume 0.09M aqueous NaOH with stirring until completely dissolved. The alginate used was high molecular weight, low G sodium alginate SATIALGINE™ S1600NS (Algaia, Lannilis, France). Results (average of 10 replicates per sample) can be found in Table 2.

Example 4

Example 3 was repeated using low molecular weight, high G sodium alginate ALGIN™ IL-6G (Kimica, Tokyo, Japan). Results (average of 10 replicates per sample) can be found in Table 2.

Example 5

Example 2 was repeated using succinic acid and low molecular weight, low G sodium alginate SATIALGINE™ S20NS (Algaia, Lannilis, France). Results can be found in Table 2.

The data in Table 2 shows that when dicarboxylates are used good results are obtained with a variety of alginates.

Examples 6-10

A sodium adipate solution was prepared by adding 1 part solid NaOH to 225 parts distilled water. To this solution was added 1.6 parts adipic acid and mixed until the adipic acid dissolved. A spinning dope was prepared by slowly adding 15 parts of a high MW, high G alginate (ALGIN I-3G-80) to the sodium adipate solution while mixing. Once dissolved, an additional 150 parts distilled water was added to give a spinning dope containing 5% by weight sodium alginate. After entrained air was removed, this solution was filtered through a filter pack, and extruded through a 60 μm 400-hole spinneret at a rate of 4 m/min. The fiber was pulled through a coagulation bath, containing 0.12M $CaCl_2$, at a rate of 4 or 12 m/min. It was then washed in deionized water and treated with a fabric softener (Neutral, Unilever, London, United Kingdom) to prevent the fibers from fusing during drying. Then the fibers were dried in 80° C. for 45 min. Drying was done either with filaments collected on a spool (constant length, under tension) or with the filaments cut from the spool (no tension). Results can be found in Table 3.

Example 11

A sodium adipate solution was prepared by adding 1 part solid NaOH to 225 parts distilled water. To this solution was added 1.6 parts adipic acid and it was mixed until the adipic acid dissolved. A spinning dope was prepared by slowly adding 15 parts of a high MW, high G alginate (ALGOGEL® 7041) to the sodium adipate solution while mixing. Once dissolved, an additional 150 parts distilled water was added to give a spinning dope containing 4% by weight sodium alginate. After entrained air was removed, this solution was extruded through a 2100 hole, 55 μm spinneret at a rate of 50 mL/min. The fiber was pulled through a coagulation bath, containing 0.12M $CaCl_2$, at a rate of 9 m/min. It was then washed in water and treated with a fabric softener (Neutral, Unilever, London, United Kingdom) to prevent the fibers from fusing during drying. Then the fibers were dried in 80° C. for 45 min. Results can be found in Table 3.

TABLE 2

| Ex. | Molecular Weight | G Ratio | Dicarboxylate | Denier (g/9000 m) | Elongation at Break (%) | Tenacity at Break (g/den) | Modulus (g/den) | Elongation at Yield (%) | Tenacity at Yield (g/den) |
|---|---|---|---|---|---|---|---|---|---|
| 2 | High | High | Adipate | 10.2 | 10.0 | 1.76 | 39 | 3.0 | 1.17 |
| 3 | High | Low | Succinate | 9.7 | 7.0 | 1.78 | 43 | 2.7 | 1.15 |
| 4 | Low | High | Succinate | 11.0 | 10.8 | 1.70 | 39 | 3.0 | 1.17 |
| 5 | Low | Low | Adipate | 9.5 | 8.2 | 1.95 | 45 | 3.2 | 1.41 |

TABLE 3

| Example | Molecular Weight | G Ratio | Dicarboxylate | Spinning Speed (Extrusion:Initial Take-Up Roller:Final Take-Up Roller, m/min) | Drying Conditions | DPF (g/9000 m) | Elongation at Break (%) | Tenacity at Break (g/den) | Modulus (g/den) |
|---|---|---|---|---|---|---|---|---|---|
| 6 | High | High | Adipate | 4:4:4 | No Tension | 3.37 | 13.06 | 1.29 | 36.47 |
| 7 | High | High | Adipate | 4:4:4 | Under Tension | 3.29 | 13.42 | 1.72 | 61.31 |
| 8 | High | High | Adipate | 4:12:12 | No Tension | 1.13 | 8.80 | 1.17 | 56.94 |
| 9 | High | High | Adipate | 4:4:4 | No Tension | 3.99 | 15.08 | 1.33 | 39.53 |
| 10 | High | High | Adipate | 4:12:12 | No Tension | 2.00 | 19.16 | 1.42 | 39.19 |
| 11 | High | High | Adipate | 10:9:13 | No Tension | 1.12 | 15.42 | 1.57 | 19.19 |

The data in Table 3 shows that when dicarboxylates are used good results are obtained with a variety of spinning conditions.

Control Example 2

A solution of a high molecular weight alginate containing a high level of guluronic acid units ("high G") was prepared by dissolving 5 parts by weight ALGIN™ I-3G-80 (Kimica, Tokyo, Japan) into 95 parts by weight distilled water. After entrained air was removed, the solution was filtered with 3 μm filter, and extruded through a 150 μm spinneret at a rate of 0.14 grams per hole per minute. The fiber was pulled through a 1 meter coagulation bath, containing 0.12M CaCl2, at 6.0 m/min. It was then drawn through a distilled water bath, to remove residual calcium salts, at 8.1 m/min, and heated on a godet. Filament was collected on a spool at 8.4 m/min. After drying under ambient conditions overnight, the sample was conditioned at 20±2° C. and 65±3% Relative Humidity before determining denier and measuring tensile properties (ASTM 2256). Results (average of 10 replicates per sample) can be found in Table 4.

Example 12

A sodium malonate solution was prepared by dissolving 0.30 parts by weight malonic acid and 5.7 parts by volume 1.0M aqueous NaOH in about 70 parts water. To this was added 5 parts by weight high molecular weight, high G sodium alginate ALGIN™ I-3G-80 and 20 parts by weight distilled water and the mixture was stirred until all the alginate was dissolved. After entrained air was removed, the solution was filtered with 3 μm filter, and extruded through a 150 μm spinneret at a rate of 0.14 grams per hole per minute. The fiber was pulled through a 1 meter coagulation bath, containing 0.12M $CaCl_2$, at 6.0 m/min. It was then drawn through a distilled water bath, to remove residual calcium salts, at 8.1 m/min, and heated on a godet. Fiber was collected on a spool at 8.4 m/min. After drying under ambient conditions overnight, filaments were conditioned at 20±2° C. and 65±3% Relative Humidity before determining filament denier and measuring tensile properties (ASTM 2256). Results (average of 10 replicates per sample) can be found in Table 4.

Example 13

Example 12 was repeated using except that a sodium succinate solution was prepared using succinic acid. Results (average of 10 replicates per sample) can be found in Table 4.

Example 14

Example 12 was repeated except in that a sodium adipate solution was prepared by dissolving 0.41 parts by weight adipic acid and 5.7 parts by volume 1.0M aqueous NaOH in about 70 parts water. Results (average of 10 replicates per sample) can be found in Table 4.

Example 15

Example 12 was repeated except that a sodium sebacate solution was prepared by dissolving 0.57 parts by weight sebacic acid and 5.7 parts by volume 1.0M aqueous NaOH in about 70 parts water. Results (average of 10 replicates per sample) can be found in Table 4.

Example 16

A sodium succinate solution was prepared by dissolving 0.47 parts by weight succinic acid and 8.0 parts by volume 1.0M aqueous NaOH in about 65 parts water. To this was added 7 parts by weight low molecular weight, high G sodium alginate ALGIN™ IL-6G and 20 parts by weight distilled water and the mixture was stirred until all the alginate was dissolved. The remainder of the Example was carried out as described in Example 12. Results (average of 10 replicates per sample) can be found in Table 4.

Example 17

Example 16 was repeated except that a sodium adipate solution was prepared by dissolving 0.58 parts by weight succinic acid and 8.0 parts by volume 1.0M aqueous NaOH in about 65 parts water. Results (average of 10 replicates per sample) can be found in Table 4.

Example 18

Example 16 was repeated except that a sodium suberate solution was prepared by dissolving 0.69 parts by weight suberic acid and 8.0 parts by volume 1.0M aqueous NaOH in about 65 parts water. Results (average of 10 replicates per sample) can be found in Table 4.

TABLE 4

| Ex. | Molecular Weight | G Ratio | Dicarboxylate | Denier (g/9000 m) | Elongation at Break (%) | Tenacity at Break (g/den) | Modulus (g/den) | Elongation at Yield (%) | Tenacity at Yield (g/den) |
|---|---|---|---|---|---|---|---|---|---|
| C2 | High | High | None | 11.3 | 4.8 | 1.15 | 69 | 1.3 | 0.87 |
| 12 | High | High | Malonate | 9.8 | 5.0 | 1.42 | 68 | 1.5 | 0.96 |
| 13 | High | High | Succinate | 9.0 | 7.0 | 1.57 | 65 | 1.5 | 1.01 |
| 14 | High | High | Adipate | 9.7 | 8.1 | 1.59 | 67 | 1.2 | 0.74 |
| 15 | High | High | Sebacate | 12.6 | 8.1 | 0.97 | 46 | 1.7 | 0.68 |
| 16 | Low | High | Succinate | 13.1 | 5.6 | 1.87 | 79 | 1.6 | 1.26 |
| 17 | Low | High | Adipate | 12.9 | 5.5 | 1.87 | 88 | 1.6 | 1.37 |
| 18 | Low | High | Suberate | 12.0 | 7.3 | 2.4 | 93 | 1.5 | 1.40 |

As can be seen from Table 4, the invention provides improved elongation and tenacity at break with a variety of dicarboxylates and alginates, without significantly compromising modulus and elongation and tenacity at yield. It is generally recognized in fiber technology that elongation and tenacity are opposing, such that when elongation increases, tenacity decreases; and vice versa. It is therefore unexpected to have achieved increased elongation and tenacity at break, as well as increased elongation and tenacity at yield.

The data shows that C4-C8 saturated aliphatic dicarboxylates perform particularly well.

Examples 19-26

Sodium sebacate solution was prepared by dissolving the indicated weights (Table 6) of sebacic acid and 1.0M aqueous NaOH in about 70 parts water. To this was added 5 parts by weight high molecular weight, high G sodium alginate ALGIN™ I-3G-80 and 20 parts by weight distilled water and the mixture was stirred until all the alginate was dissolved. After entrained air was removed, the solution was filtered with 3 μm filter, and extruded through a 150 μm spinneret at a rate of 0.14 grams per hole per minute. The fiber was pulled through a 1 meter coagulation bath, containing 0.12M $CaCl_2$, at 6.0 m/min. It was then drawn through a distilled water bath, to remove residual calcium salts, at 8.1 m/min, and heated on a godet. Fiber was collected on a spool at 8.4 m/min. After drying under ambient conditions overnight, filaments were conditioned at 20±2° C. and 65±3% Relative Humidity before determining filament denier and measuring tensile properties (ASTM 2256). Results (average of 10 replicates per sample) can be found in Table 5.

TABLE 5

| Ex. | Sebacic Acid (wt %) | 1.0M NaOH (wt %) | Alginate (wt %) | Denier (g/9000 m) | Elongation at Break (%) | Tenacity at Break (g/den) | Modulus (g/den) | Elongation at Yield (%) | Tenacity at Yield (g/den) |
|---|---|---|---|---|---|---|---|---|---|
| 17 | 0.00 | 0.00 | 5.0 | 9.4 | 3.1 | 1.31 | 81 | 1.2 | 0.84 |
| 18 | 0.23 | 2.29 | 5.0 | 9.5 | 5.0 | 1.75 | 82 | 1.4 | 1.07 |
| 19 | 0.34 | 3.44 | 5.0 | 9.4 | 7.1 | 1.55 | 63 | 1.6 | 0.85 |
| 20 | 0.46 | 4.59 | 5.0 | 9.6 | 5.9 | 1.86 | 86 | 1.3 | 1.07 |
| 21 | 0.57 | 5.74 | 5.0 | 10.6 | 6.0 | 1.81 | 81 | 1.4 | 1.15 |
| 22 | 0.69 | 6.88 | 5.0 | 9.0 | 7.2 | 1.76 | 72 | 1.6 | 1.07 |
| 23 | 0.80 | 8.03 | 5.0 | 9.3 | 7.1 | 2.11 | 85 | 1.5 | 1.20 |
| 24 | 0.92 | 9.18 | 5.0 | 8.2 | 3.7 | 1.08 | 63 | 1.2 | 0.65 |

As can be seen from Table 5, the invention provides improved elongation and tenacity at break, without significantly compromising modulus and elongation and tenacity at yield. Recognizing that elongation and tenacity are opposing, such that when elongation increases, tenacity decreases, and vice versa, it is unexpected to have achieved increased elongation and tenacity at break, as well as increased elongation and tenacity at yield.

Measurements

The following measurement techniques were used for the Examples.

Denier is a linear density unit which is the mass in grams per 9000 meters of a fiber.

For Examples 1-5 and 12-26, and Control Examples 1-2, denier measurement involved collecting a known length of fiber, conditioning it in a climate chamber (22±3° C. and 65±5%) for at least 24 hours, and then measuring the weight.

For Examples 1-5 and 12-26, and Control Examples 1 and 2, tensile measurements were obtained using an EXPERT 7600 from ADMET (Norwood, Massachusetts, USA) at 50.8 mm/min and a clamp distance of 80 mm on conditioned fibers at 20±2° C. and 65±3% relative humidity for at least 12 hours (ASTM 2256).

For Examples 6-11, mechanical properties, denier and tensile testing, were obtained using a VIBROSKOP/VIBRODYN from Lenzing Technik (Austria) at 20 mm/min and a clamp distance of 20 mm on conditioned fibers at 20±2° C. and 65±3% relative humidity for overnight (EN ISO 5079).

Example 27

Similar examples to the preceding examples are run using the following cationic crosslinking agents: barium chloride, aluminum chloride, copper chloride, copper sulfate, aluminum sulfate, iron sulfate, and zinc sulfate.

Example 28

Similar experiments to the preceding invention examples are run using the following bases in place of sodium hydroxide: potassium hydroxide, ammonium hydroxide, sodium carbonate, potassium carbonate, lithium carbonate, lithium hydroxide, sodium bicarbonate, potassium bicarbonate, and lithium bicarbonate.

Example 29

Similar examples to those describing the invention are carried out to prepare filaments having the following denier: 0.75 dpf, 1 dpf, 2 dpf, 3 dpf, and 5 dpf.

Example 30

The filaments of the preceding examples are crimped and cut to make staple fibers of the following lengths: 1 inch, 1.25 inch, 2 inches, 4 inches, and 6 inches.

Example 31

Spun yarn blends are prepared using (a) 10 weight %, 25 weight %, 30 weight %, 40 weight %, 45 weight %, 50 weight %, 55 weight %, 60 weight %, 75 weight %, 90 weight % and 100 weight % of staple fibers made from the fibers of Examples 28 with (b) the balance being commercially available (i) 0.5 dpf, 1 dpf, 2 dpf, 3 dpf, 5 dpf and 10 dpf staple fibers of the synthetic and semi-synthetic polymers listed in Table 8 (having corresponding lengths to those of the staple fibers of the invention) or (ii) the natural fibers listed in listed in Table 6.

TABLE 6

| | Blended Yarns |
|---|---|
| A | Cotton |
| B | Wool |
| C | Viscose (Rayon) |
| D | Lyocell (Rayon) |
| E | Polylactic Acid (PLA) |
| F | Polyhydroxybutyrate (PHA) |
| G | Linen |
| H | Hemp |
| I | Silk |
| J | Chitosan |
| K | Aramid (Nomex ®) |
| L | Aramid (Kevlar ®) |
| M | Polyester (Polyethylene Terephthalate) |
| N | Polytrimethylene Terephthalate (Sorona ®) |
| O | Polybutylene Terephthalate (PBT) |
| P | Nylon 6, 6 |
| Q | Nylon 6 |
| R | Nylon 6, 10 |
| S | Nylon 6, 12 |
| T | Nylon 5, 6 |
| U | Polypropylene |
| V | Polyethylene |

Example 32

Yarns are prepared using (a) 10 weight %, 25 weight %, 30 weight %, 40 weight %, 45 weight %, 50 weight %, 55 weight %, 60 weight %, 75 weight %, 90 weight %, and 100 weight % of continuous filaments made from the fibers of the preceding invention examples with (b) the balance being commercially available (i) 0.5 dpf, 1 dpf, 2 dpf, 3 dpf, 5 dpf and 10 dpf continuous fibers of the synthetic and semi-synthetic polymers listed in Table 7 or (ii) continuous silk fibers.

TABLE 7

| | Blended Yarns |
|---|---|
| AA | Viscose (Rayon) |
| BB | Lyocell (Rayon) |
| CC | Polylactic Acid (PLA) |
| DD | Polyhydroxybutyrate (PHA) |
| EE | Silk |
| FF | Chitosan |
| GG | Aramid (Nomex ®) |
| HH | Aramid (Kevlar ®) |
| II | Polyester (Polyethylene Terephthalate) |
| JJ | Polytrimethylene Terephthalate (Sorona ®) |
| KK | Polybutylene Terephthalate (PBT) |
| LL | Nylon 6, 6 |
| MM | Nylon 6 |
| NN | Nylon 6, 10 |
| OO | Nylon 6, 12 |
| PP | Nylon 5, 6 |
| QQ | Polypropylene |
| RR | Polyethylene |

Example 33

Fabrics are prepared using (a) 10 weight %, 25 weight %, 30 weight %, 40 weight %, 45 weight %, 50 weight %, 55 weight %, 60 weight %, 75 weight %, 90 weight %, and 100 weight % of yarns of continuous filaments of the preceding invention examples with (b) the balance being appropriate size commercially available yarns of the materials listed in Table 8.

Example 34

Fabric blends are prepared using (a) 10 weight %, 25 weight %, 30 weight %, 40 weight %, 45 weight %, 50 weight %, 55 weight %, 60 weight %, 75 weight %, 90 weight %, and 100 weight % of yarns of staple fibers of the preceding invention examples with (b) the balance being appropriate size yarns of commercially available fibers of the materials described in Table 8.

TABLE 8

| | Blended Fabrics |
|---|---|
| A | Cotton |
| B | Wool |
| C | Viscose (Rayon) |
| D | Lyocell (Rayon) |
| E | Polylactic Acid (PLA) |
| F | Polyhydroxybutyrate (PHA) |
| G | Linen |
| H | Hemp |
| I | Silk |
| J | Chitosan |
| K | Aramid (Nomex ®) |
| L | Aramid (Kevlar ®) |
| M | Polyethylene Terephthalate (PET) |
| N | Polytrimethylene Terephthalate (Sorona ®) |
| O | Polybutylene Terephthalate (PBT) |
| P | Nylon 6, 6 |
| Q | Nylon 6 |
| R | Nylon 6, 10 |
| S | Nylon 6, 12 |
| T | Nylon 5, 6 |
| U | Polypropylene |
| V | Polyethylene |

Example 35

Example 32 is repeated with use of 1, 2, 3, 4, 5 and 10 weight % of spandex (elastane) continuous filaments having appropriate sizes (e.g., 0.5 dpf, 1 dpf, 2 dpf, 3 dpf and 5 dpf—measured in the relaxed stated prior to stretching) and stretch characteristics for desired yarn and fabric properties.

Example 36

Example 31 is repeated with use of 1, 2, 3, 4, 5 and 10 weight % of polyethylene terephthalate/polytrimethylene terephthalate (PET/PTT) side by side or sheath/core staple fibers having appropriate sizes (e.g., 0.5 dpf, 1 dpf, 2 dpf, 3 dpf and 5 dpf) and stretch characteristics for desired yarn and fabric properties.

Example 37

Example 32 is repeated with use of 1, 2, 3, 4, 5 and 10 weight % of PET/PTT side by side or sheath/core continuous filaments having appropriate sizes (e.g., 0.5 dpf, 1 dpf, 2 dpf, 3 dpf and 5 dpf) and stretch characteristics for desired yarn and fabric properties.

Example 38

Example 31 is repeated using 1, 2, 3, 4, 5 and 10 weight % of polyethylene terephthalate/polybutylene terephthalate (PET/PBT) side by side or sheath/core staple fibers having appropriate sizes (e.g., 0.5 dpf, 1 dpf, 2 dpf, 3 dpf and 5 dpf) and stretch characteristics for desired yarn properties.

Example 39

Example 32 is repeated with use of 1, 2, 3, 4, 5 and 10 weight % of PET/PBT side by side or sheath/core continuous filaments having appropriate sizes (e.g., 0.5 dpf, 1 dpf, 2 dpf, 3 dpf and 5 dpf) and stretch characteristics for desired fabric properties.

Example 40

Example 32 is repeated with use of 1, 2, 3, 4, 5 and 10 weight % of melt-spun thermoplastic elastomeric continuous filaments having appropriate sizes (e.g., 0.5 dpf, 1 dpf, 2 dpf, 3 dpf, 5 dpf and 10 dpf—measured in the relaxed stated prior to stretching) and stretch characteristics for desired yarn and fabric properties.

Other embodiments of the present disclosure will be apparent to those skilled in the art from consideration of the present specification and practice of the present disclosure disclosed herein. It is intended that the present specification and examples be considered as exemplary only with a true scope and spirit of the disclosure being indicated by the following claims and equivalents thereof.

What is claimed is:

1. A polymer comprising an alginate which is ionically crosslinked with unsubstituted, aliphatic dicarboxylate-bridged multivalent cations, wherein the unsubstituted, aliphatic dicarboxylate is derived from an alicyclic dicarboxylic acid selected from the group consisting of cyclopentane dicarboxylic acid, cyclohexane dicarboxylic acid, and norbornane dicarboxylic acid.

2. The polymer of claim 1 made by a process comprising:

1) combining:

at least one monovalent cationic alginate salt;

the alicyclic dicarboxylic acid; and at least one multivalent cationic crosslinking agent; and 2) reacting them to form a polymer.

3. A process of preparing a shaped article from the polymer of claim 1 comprising:

a. shaping the polymer to form a shaped article.

4. A fiber comprising the polymer of claim 1.

5. A process of preparing a fiber of by a wet spinning process, the fiber comprising a polymer comprising an alginate which is ionically crosslinked with unsubstituted, aliphatic dicarboxylate-bridged multivalent cations, the wet spinning process comprising a. Preparing a dope of at least one monovalent metal alginate salt and at least one unsubstituted, aliphatic C2-C20 dicarboxylate in solvent;

b. Extruding the dope through a spinneret to form fibers;

c. Drawing the fibers through at least one coagulation bath containing solvent and at least one multivalent cationic crosslinking agent; and d. Drying the fibers.

6. The process of claim 5 wherein the solvent of the dope is water and the solvent of the coagulation bath is water.

7. The process of claim 6 wherein:

a. the alginate salt is sodium, potassium, or ammonium salt, has a molecular weight of about 10,000 to about 500,000 and has G/M ratio of about 1 to about 2.5;

b. the at least one unsubstituted, aliphatic C2-C20 dicarboxylate is sodium, potassium, lithium, or ammonium dicarboxylate;

c. the multivalent cationic crosslinking agent has cations selected from the group consisting of calcium, copper, iron, aluminum, zinc, magnesium, barium, chromium, cobalt, nickel, manganese, and mixtures thereof;

d. the dope comprises 0.5 to 50% by weight of the monovalent metal alginate salt, by weight of the dope;

e. the dope is prepared with about 1 to about 125% of the at least one unsubstituted dicarboxylate based on the weight of the alginate salt; and f. the coagulation bath contains about 0.02 to about 2 moles per liter of the at least one multivalent cationic crosslinking agent in the solvent.

8. The process of claim 6 wherein the crosslinking agent is selected from the group consisting of calcium chloride, barium chloride, calcium bicarbonate, copper sulfate, aluminum sulfate, iron sulfate, zinc sulfate, and mixtures thereof.

9. The process of claim 8 wherein the dicarboxylate is derived from an unsubstituted aliphatic dicarboxylic acid selected from the group consisting of succinic acid, glutaric acid, adipic acid, pimelic acid, suberic acid, azelaic acid, sebacic acid, and mixtures thereof.

10. The process of claim 9 wherein the dicarboxylate is derived from a C4-C8 dicarboxylic acid.

11. The process of claim 10 wherein the at least one unsubstituted, aliphatic C2-C20 dicarboxylate is sodium, potassium, lithium, or ammonium dicarboxylate.

12. A fiber prepared by the process of claim 10.

13. A fabric prepared from the fiber of claim 12.

14. A fiber prepared by the process of claim 5.

15. A fabric prepared from the fiber of claim 14.

16. The process of claim 5, wherein the at least one multivalent cationic crosslinking agent is selected from the group consisting of calcium chloride, barium chloride, aluminum chloride, copper chloride, magnesium chloride, copper sulfate, aluminum sulfate, iron sulfate, zinc sulfate, magnesium sulfate, and mixtures thereof.

17. The polymer process of claim 5 wherein the polymer is bridged using a C2-C20 unsubstituted, aliphatic dicarboxylate.

18. The polymer process of claim 17 wherein the unsubstituted dicarboxylate is a saturated C3-C12 unsubstituted, aliphatic dicarboxylate.

19. The polymer process of claim 18 wherein the unsubstituted, aliphatic dicarboxylate is linear.

20. The polymer process of claim 5 wherein the unsubstituted, aliphatic dicarboxylate is derived from a dicarboxylic acid selected from the group consisting of malonic acid, succinic acid, glutaric acid, adipic acid, pimelic acid, suberic acid, azelaic acid, sebacic acid, undecanedioic acid, dodecanedioic acid, brassylic acid, and tetradecanedioic acid.

21. A process of preparing a fiber by a wet spinning process which comprises:

a. Preparing a dope of at least one monovalent metal alginate salt and an at least one unsubstituted, aromatic C2-C20 dicarboxylate in solvent;

b. Extruding the dope through a spinneret to form fibers;

c. Drawing the fibers through at least one coagulation bath containing solvent and at least one multivalent cationic crosslinking agent; and d. Drying the fibers.

* * * * *